US011190474B2

(12) United States Patent
Brezina et al.

(10) Patent No.: US 11,190,474 B2
(45) Date of Patent: *Nov. 30, 2021

(54) METHOD AND SYSTEM FOR COLLECTING AND PRESENTING HISTORICAL COMMUNICATION DATA FOR A MOBILE DEVICE

(71) Applicant: VERIZON MEDIA INC., New York, NY (US)

(72) Inventors: Matthew Brezina, San Francisco, CA (US); Adam Smith, San Francisco, CA (US); Jeffrey Bonforte, San Francisco, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,992

(22) Filed: Jan. 21, 2020

(65) Prior Publication Data

US 2020/0162566 A1  May 21, 2020

Related U.S. Application Data

(63) Continuation of application No. 15/640,513, filed on Jul. 1, 2017, now Pat. No. 10,554,769, which is a
(Continued)

(51) Int. Cl.
*H04L 29/08* (2006.01)
*H04L 12/58* (2006.01)
(Continued)

(52) U.S. Cl.
CPC ............ *H04L 51/16* (2013.01); *G06F 3/0481* (2013.01); *G06F 3/0482* (2013.01);
(Continued)

(58) Field of Classification Search
CPC ...... H04M 15/00; H04M 15/43; H04M 15/44; H04M 15/58; H04M 15/745; H04M 2215/0104; H04M 2215/0108; H04M 2215/0188; H04L 67/306; H04L 51/046; H04L 51/16; H04L 51/36; H04L 67/22;
(Continued)

(56) References Cited

U.S. PATENT DOCUMENTS 7,908,647 B1 * 3/2011 Polis ..................... H04L 63/083 726/5
9,564,025 B1 * 2/2017 Nielsen ................... H04L 67/22
(Continued)

*Primary Examiner* — Khawar Iqbal
(74) *Attorney, Agent, or Firm* — James J. DeCarlo; Greenberg Traurig, LLP

(57) ABSTRACT

Among other disclosures, a method may include collecting historical communication data and personal data relating to a portion of a plurality of communications, a sender of one or more of the communications or one or more recipients of the communications. The method may include depositing the collected data into a repository of historical communication data and personal data. The method may include presenting one or more items in the repository on a mobile device, in response to user behavior.

18 Claims, 8 Drawing Sheets

Related U.S. Application Data continuation of application No. 14/089,590, filed on Nov. 25, 2013, now Pat. No. 9,699,258, which is a continuation of application No. 12/180,453, filed on Jul. 25, 2008, now Pat. No. 8,600,343.

(60) Provisional application No. 60/951,880, filed on Jul. 25, 2007.

(51) Int. Cl.

| | | |
|---|---|---|
| *G06F 3/0484* | (2013.01) | |
| *G06F 3/0481* | (2013.01) | |
| *G06F 16/38* | (2019.01) | |
| *G06F 16/248* | (2019.01) | |
| *G06F 16/957* | (2019.01) | |
| *G06F 16/2457* | (2019.01) | |
| *H04M 15/00* | (2006.01) | |
| *G06F 40/14* | (2020.01) | |
| *H04W 24/08* | (2009.01) | |
| *G06F 3/0482* | (2013.01) | |
| *G06F 3/048* | (2013.01) | |

(52) U.S. Cl.
CPC ........ *G06F 3/0484* (2013.01); *G06F 3/04842* (2013.01); *G06F 16/248* (2019.01); *G06F 16/24575* (2019.01); *G06F 16/38* (2019.01); *G06F 16/9577* (2019.01); *G06F 40/14* (2020.01); *H04L 51/046* (2013.01); *H04L 51/22* (2013.01); *H04L 51/36* (2013.01); *H04L 67/22* (2013.01); *H04L 67/306* (2013.01); *H04M 15/00* (2013.01); *H04M 15/43* (2013.01); *H04M 15/44* (2013.01); *H04M 15/58* (2013.01); *H04M 15/745* (2013.01); *H04W 24/08* (2013.01); *G06F 3/048* (2013.01); *H04L 51/08* (2013.01); *H04M 2215/0104* (2013.01); *H04M 2215/0108* (2013.01); *H04M 2215/0188* (2013.01)

(58) Field of Classification Search
CPC ............... H04L 51/22; G06F 17/30554; G06F 17/30722; G06F 17/30905; G06F 17/2247; G06F 3/04842; G06F 3/0482; G06F 16/24575; G06F 16/9577; G06F 16/248; G06F 16/38; G06F 3/0481; G06F 3/0484; G06F 40/14; G06F 3/048; H04W 24/08

See application file for complete search history.

(56) References Cited

U.S. PATENT DOCUMENTS

| | | | |
|---|---|---|---|
| 9,596,308 B2* | 3/2017 | Brezina | G06F 3/04842 |
| 9,767,418 B2* | 9/2017 | Reimer | G06F 16/487 |
| 10,958,741 B2* | 3/2021 | Brezina | G06F 3/0484 |
| 10,963,524 B2* | 3/2021 | Smith | G06Q 10/107 |
| 2005/0171799 A1* | 8/2005 | Hull | G06Q 30/0601 |
| | | | 705/319 |
| 2006/0195361 A1* | 8/2006 | Rosenberg | G06Q 30/0267 |
| | | | 705/14.52 |
| 2006/0256008 A1* | 11/2006 | Rosenberg | G01S 5/0072 |
| | | | 342/367 |
| 2007/0016647 A1* | 1/2007 | Gupta | G06Q 10/107 |
| | | | 709/206 |
| 2007/0206736 A1* | 9/2007 | Sprigg | H04L 67/306 |
| | | | 379/88.21 |
| 2007/0219955 A1* | 9/2007 | Li | G06Q 30/0241 |
| 2008/0316925 A1* | 12/2008 | Dolin | G06Q 30/02 |
| | | | 370/232 |
| 2009/0005011 A1* | 1/2009 | Christie | H04M 1/72436 |
| | | | 455/412.2 |
| 2009/0037541 A1* | 2/2009 | Wilson | G06Q 10/10 |
| | | | 709/206 |
| 2009/0082038 A1* | 3/2009 | McKiou | H04W 4/02 |
| | | | 455/456.6 |
| 2018/0068351 A1* | 3/2018 | Choi | G06Q 30/0269 |

\* cited by examiner

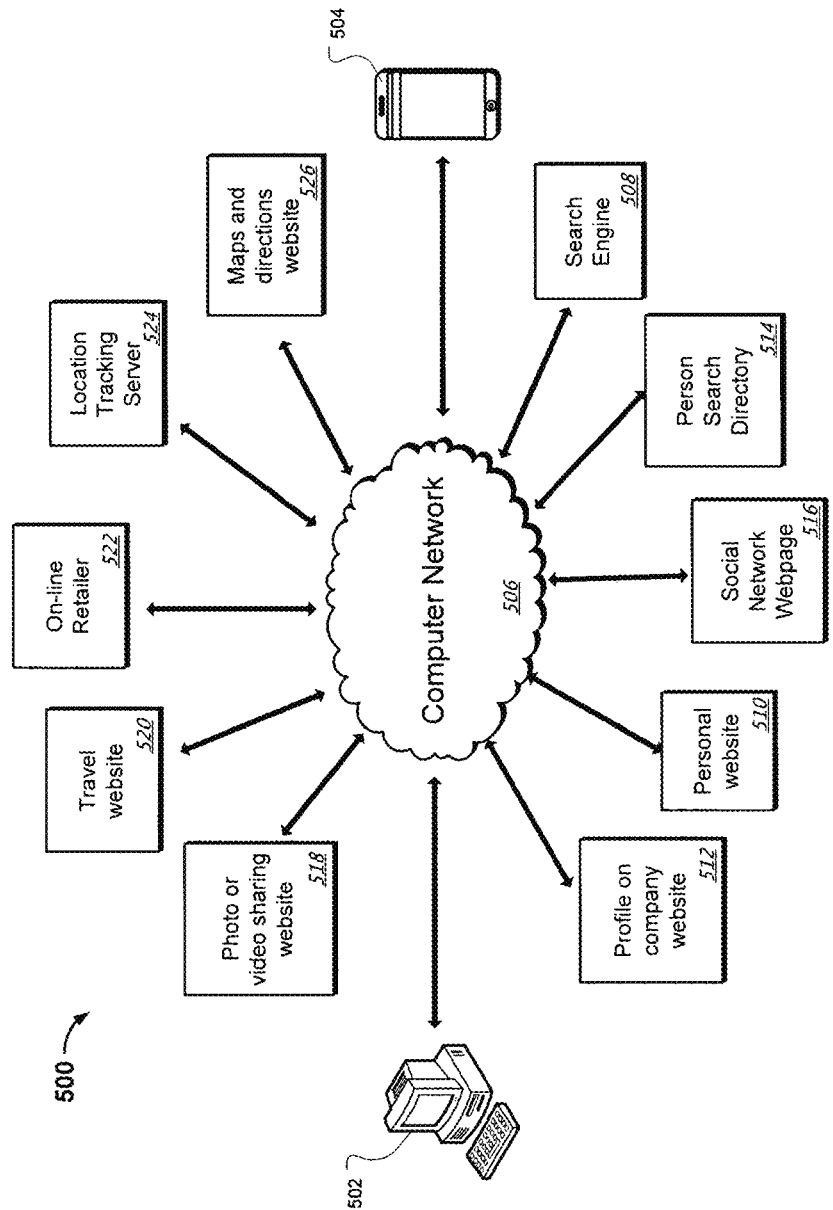

METHOD AND SYSTEM FOR COLLECTING AND PRESENTING HISTORICAL COMMUNICATION DATA FOR A MOBILE DEVICE

RELATED APPLICATIONS

The present application is a continuation application of U.S. patent application Ser. No. 15/640,513, filed on Jul. 1, 2017, entitled "Method and system for collecting and presenting historical communication data for a mobile device" which is a continuation of U.S. patent application Ser. No. 14/089,590, filed on Nov. 25, 2013, entitled "Method and System for Collecting and Presenting Historical Communication Data for a Mobile Device," which is a continuation application of U.S. patent application Ser. No. 12/180,453, filed on Jul. 25, 2008, entitled "Method and System for Collecting and Presenting Historical Communication Data for a Mobile Device," which claims priority to U.S. Prov. App. No. 60/951,880, filed on Jul. 25, 2007, entitled "Presentation of Personal and Public Data Queried Through Implicit Actions", the contents of which applications are incorporated herein by reference.

BACKGROUND

Electronic communications between persons for both business and personal use have increased substantially in recent years. In addition to the number of communications increasing, the number of available communication mediums has also increased. In addition to e-mail communications and telephone communications, additional forms of communication have become common in recent years, including instant messaging, social network messaging and commenting, message board posting, text messaging, and Voice Over Internet Protocol communications.

These additional forms of communication have led to individuals exchanging communications with more people than ever before, which leads to an even higher increase in the number of communications sent and received by an individual.

SUMMARY OF THE DESCRIPTION

In a first aspect, a computer implemented method for collecting and presenting historical communication data for a mobile device can include collecting historical communication data and personal data relating to a portion of a plurality of communications, a sender of one or more of the communications or one or more recipients of the communications. The method can further include generating a profile containing information about a person using the historical communication data and personal data. The method can further include monitoring use of a mobile communication device. The method can further include determining if the user of the mobile communication device has made a request to view the profile. The method can further include presenting the profile on the mobile communication device in response to the request.

The method can further include storing the profile on the mobile communication device. The method can further include retrieving the profile from a network resource accessible over a mobile communication link. The method can further include adapting the profile for display on the mobile communications device.

BRIEF DESCRIPTION OF THE DRAWINGS

FIG. 5 is a block diagram of an example communication delivery system including a mobile device.

DETAILED DESCRIPTION

Figure 1A:
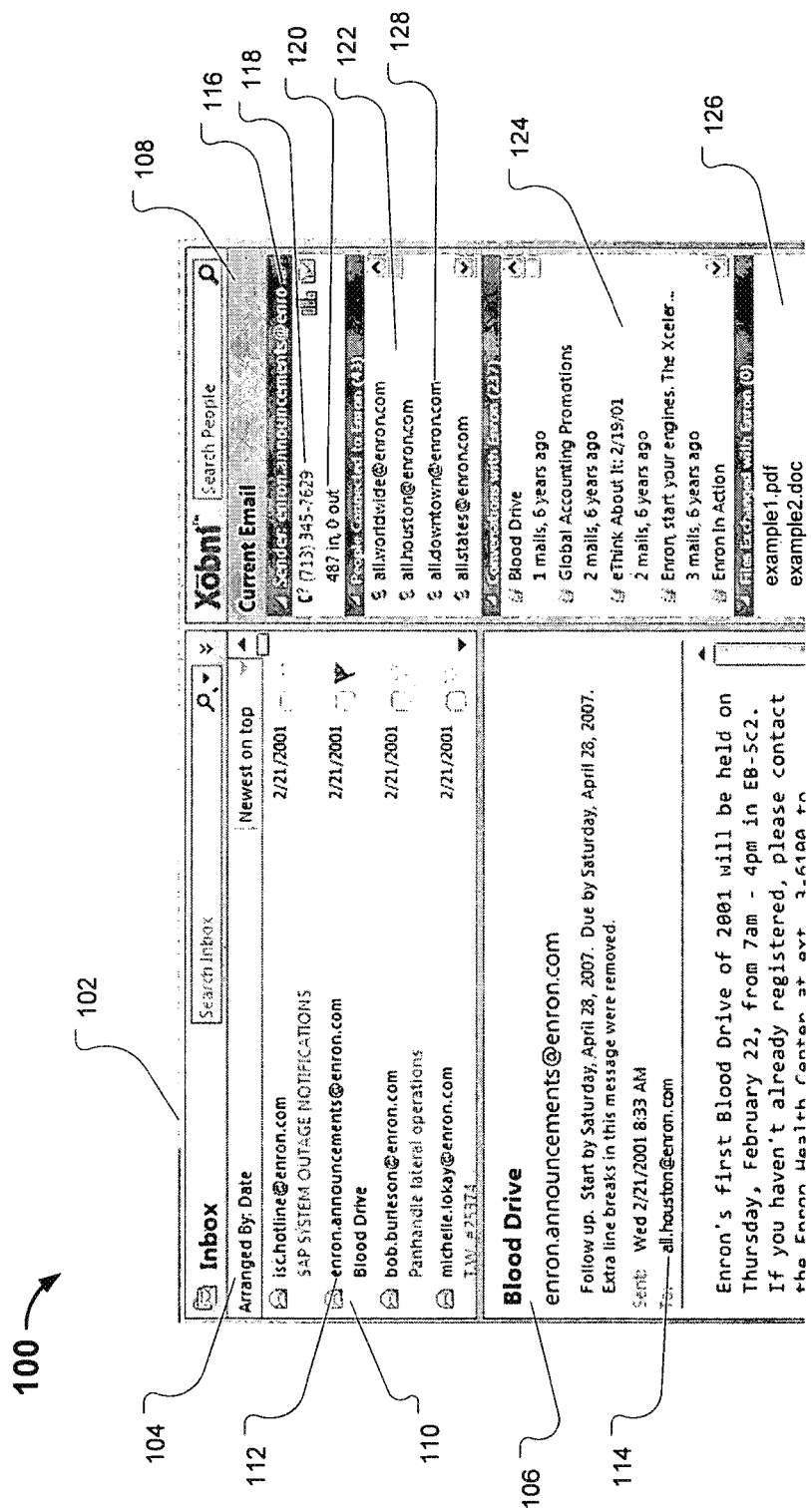
FIG. 1A shows an example e-mail client with a profile side bar.

FIG. 1A shows an example system 100 for displaying a profile containing information about communications to, from, and involving an individual. The system 100 includes an e-mail client 102 which can include an inbox viewing panel 104 and an e-mail viewing panel 106. The e-mail client 102 can be a standard stand alone e-mail client such as Microsoft Outlook or Eudora. In an alternate implementation the e-mail client 102 can be a web based e-mail client such as Yahoo! mail or Gmail that is viewed using a web browser. The e-mail client 102 can allow a user to view a list of e-mails in the inbox viewing panel 104. The user can select an e-mail in the inbox viewing panel 104 causing the e-mail client 102 to display the selected e-mail in the e-mail viewing panel 106.

In some implementations, instead of an e-mail client, the system 100 can include an instant messaging client, a social network client, a text message client, or another communication viewing client. It is to be understood that while portions of this description describe systems and methods involving e-mail communications, these same systems and methods can be implemented using other forms of communication, including instant messages, phone calls, text messages, internet message board postings, social network messages or comments, or voice over IP communications.

The e-mail client 102 also includes a profile 108. In the example depicted, the profile 108 is displayed as an additional panel within the e-mail client 102 positioned to the right of the inbox viewing panel 104 and the e-mail viewing panel 106. This additional panel is sometimes referred to as a side bar. In other implementations, the profile 108 can be located at the top, bottom, left side, or any other location within the e-mail client 102. In still other implementations, the profile 108 can be displayed in a stand alone window, in a pop-up bubble displayed over a portion of the e-mail client 102, or integrated as part of one of the other viewing panels displayed by the e-mail client 102. For example, a pop up bubble containing a profile 108 could appear when an e-mail is selected in the inbox viewing panel 104, when an e-mail address or portion of text in the e-mail viewing panel 106 is selected, or when a mouse icon is moved over an e-mail address, name, icon, or portion of text. In another example, information can be integrated as part of the body of an e-mail, such as inserting a picture next to a person's name in the body of an e-mail, or inserting a person's name next to a phone number in an e-mail or attachment.

The profile 108 can contain information relating to a sender of an e-mail, a recipient of an e-mail, the body of an e-mail, an attachment to an e-mail, or a person or topic mentioned in an e-mail. In alternate implementations, the profile 108 can contain information related to a sender, recipient, body, attachment or topic of another communication medium such as an instant message, a phone call, a text message, an internet message board, a social network message or comment, or a voice over IP communication. The user can implicitly request information to be displayed in the profile 108 by selecting an e-mail in the inbox viewing panel 104 or selecting text within a header or body of an e-mail in the e-mail viewing panel 106. In some implementations, the profile can include additional information (e.g., derived information such as search results derived from a topic mentioned in a communication).

In some implementations, the profile 108 can display information about an entity other than a person. For example, a communication may be received from an automated system, such as from a travel website, on-line retailer, an advertising service, or a mailing list. The profile 108 can display information related to the sender of the communication. For example, if the communication received has been sent from a travel website, information related to the travel website, or other communications from the travel website can be displayed. In another example, if the communication received has been sent from an mailing list, information related to the mailing list, or other communications received from the mailing list can be displayed. As yet another example, if the communication received has been sent from a business entity, information about the business entity (e.g., address, telephone number, contact person name) can be included in the profile.

For example, the user can select an e-mail 110 in the inbox viewing panel 104 causing the profile 108 to display information related to a sender 112 of the e-mail 110. In another example, the user can select an e-mail address 114 or name of a recipient of the e-mail 110 in order to display information related to the recipient in the profile 108. In another example, the user can select an attachment to the e-mail 110 in order to display information related to the attachment in the profile 108. In yet another example, the user can select the name of a person, a user name of a person, or a particular topic listed in a header, a body, or an attachment of the e-mail 110 in order to display information related to the person or topic in the profile 108.

In some implementations, the system 100 can determine if the user has made an implicit request to view information in the profile 108 by tracking, for example, user input of the form of mouse movements, mouse locations, keyboard strokes, mouse clicks, or active windows. Implicit requests to view information in the profile 108 can include opening, viewing, reading or writing an e-mail or other communication medium. For example, if the user starts to compose an instant message, the profile 108 can display information related to the recipient of the instant message. In another example, if the user views a social network profile, either within the e-mail client 102 or in a separate web browser, the profile 108 can display information related to a person associated with the social network profile.

In some implementations, the user can make a specific request to view information in the profile 108 by performing a search or clicking on a person's name.

In some implementations, the system 100 can be linked to a phone (e.g., voice over IP phone) used by the user. For example, the system 100 can include means for detecting when the user makes or receives a phone call or text message using the phone and display information related to a recipient or initiator of the phone call or text message in the profile 108.

In the example depicted in FIG. 1A, the user has selected the e-mail 110 in the inbox viewing panel 104 and header information and a portion of the body of the e-mail 110 is displayed in the e-mail viewing panel 106. The e-mail 110 was received from the sender 112. The system 100 has determined that the user has made an implicit request to view information related to the sender 112 by selecting the e-mail 110. In response to this implicit request, the system 100 displays in the profile 108 information related to the sender 112.

In the example, the information displayed in the profile 108 includes an e-mail address 116, a phone number 118, communication statistics 120, a contact network 122, a conversation list 124, and a files exchanged list 126. In some implementations, the profile 108 can display additional contact information such as name, screen names, social network profile names, social network profile URLs, physical addresses, website URLs, additional e-mail addresses, or additional telephone numbers.

In the example, the communication statistics 120 include the number of e-mails received from the sender 112 and the number of e-mails sent to the sender 112. In other implementations, additional communication statistics 120 can be displayed, including times of communications, dates of communications, types of communications, volume of communications, length of communications, or speed of responses. For example, a statistic for the average amount of time it takes the sender 112 to respond to e-mails sent by the user can be displayed. In another example, the times of day that the sender 112 is most likely to respond to an e-mail or other form of communication can be displayed as a communication statistic 120. In another example, a statistic can be displayed that lists the percentage of communications between the user and the sender 112 that occur using a telephone, the percentage of communications that occur using instant messaging, the percentage of communications that occur using e-mails, or the percentage of communications that occur using a social network website as a percentage of all communications between the user and the sender 112. In another example, the number of communications sent or received on which the sender 112 has been copied can be displayed as a communication statistic 120. In another example, the number of communications received by the user on which the sender 112 has also been listed as a recipient can be displayed as a communication statistic 120.

In some implementations, the communication statistics 120 that are displayed can be chosen by the user. The user can choose to have a default set of communication statistics displayed, or the user can select which individual communication statistics 120 are to be displayed. The user can choose to have the same set of communication statistics 120 displayed for each profile 108 or the user can choose to have a different set of communication statistics 120 displayed depending on which person or topic the currently displayed profile 108 is associated with.

The contact network 122 displayed in the profile 108 shows a list of contacts 128 that are associated with the sender 112. In the example depicted, the contacts 128 are shown as e-mail addresses. In other implementations, the contacts 128 can be listed as names, screen names, nick names, employee numbers, social network profile names, social network profile URLs, telephone numbers, website URLs, or any combination of these.

In some implementations, details about a contact 128 can be displayed adjacent to the contact 128 in the contact network 122. These details can include time since last communication, last form of communication, frequency of communications, total numbers of communications, or other related data.

The contacts 128 listed in the contact network 122 are contacts that are associated with the sender 112. The contacts 128 can include recipients of communications from the sender 112, recipients of communications of which the sender 112 is also a recipient, individuals named in a body or header of a communication with the sender 112, or individuals named in a document that is attached to a communication with the sender 112. For example, a person who was copied on an e-mail between the user and the sender 112 can be listed as a contact 128 in the contact network 122. In the example depicted, the header of the e-mail 110 as shown in the e-mail viewing panel 106 lists all.houston@enron.com as a recipient of the e-mail 110. The contact network 122 lists all.houston@enron.com as a contact 128 of the sender 112. In another example, if the user receives an e-mail from the sender 112 with the subject line "Matt Smith's birthday party", Matt Smith can be listed as a contact 128 in the contact network 122 even if Matt Smith has never been included in or been the recipient of any communications between the user and the sender 112. In another example, if the user posts a comment to a social network profile page belonging to the sender 112 and a person named Eric Johnson has also posted a comment to the social network profile page, or is listed as a friend of the sender 112 on the social network profile page, Eric Johnson can be listed as a contact 128 in the contact network 122.

In some implementations, the contacts 128 listed in the contact network 122 can be collected from sources other than communications between the user and the sender 112. In one implementation, the sender 112 can provide a list of contacts to the user to include in the contact network 122 for the sender 112. The sender 112 can provide the list of contacts to the user through sharing the list of contacts on a shared network, or by sending a communication to the user with, for example, the list of contacts in a body of the communication or in an attachment to the communication.

In another implementation, the system 100 can collect data from outside sources in order to determine contacts 128 to be listed in the contact network 122. The system 100 can query various sources to extract information on contacts that can be associated with the sender 112 and listed in the contact network 122. Sources of information that can be queried to derive contacts associated with the sender 112 can include web search engines, people search engines, social networks, personal web pages, telephone directories, scanned business card data or company website profiles.

For example, the system 100 can perform a search of a social network based on the sender 112's name, e-mail address, screen names or other information about the sender 112. The system can then identify a profile page on the social network belonging to the sender 112. Any contacts that are publicly listed on the social network profile page can be listed in the contact network 122 of the sender 112 even if the user has never communicated with the sender 112 using the social network or viewed the profile page of the sender 112 on this social network. In some implementations, the system 100 can access and extract contacts listed on a private social network profile page belonging to the sender 112 if the user has proper access information or authorization to view the private social network profile page of the sender 112.

In another example, the system 100 can use a search engine to perform a search based on the sender 112's name, e-mail address, screen names or other information about the sender 112 in order to identify web pages that may contain contacts that can be associated with the sender 112. For example, the system 100 can use a search engine to perform a search based on the sender 112's name. If one of the search results returned is for a blog written by a person named Mark Adams that mentions the sender 112, then Mark Adams can be listed as a contact 128 in the contact network 122. In another example, the system 100 can determine that the sender 112 works for the same company as a person who has sent a different communication to the user. This person can then be listed as a contact 128 of the sender 112. In some implementations, the system 100 can collect data using a peer to peer network.

Information that can be used to collect information about contacts 128 or other information displayed in the profile 108 can include e-mail addresses, names, screen names, social network profile names, phone numbers, personal website URLs, social network profile URLs, or physical addresses.

The contacts 128 displayed in the contact network 122 can be listed in order based on a ranking system. Criteria used to rank the contacts 128 can include total volume of communication, volume of communication over a period of time, length of communications, importance level of communications, types of communications, contents of communications, time of communications; methods by which the contacts 128 were determined to be associated with the sender 112, or any combination of these. For example, the contacts 128 can be ranked based on the total number of communications between the user and the sender 112 for which a contact is also a recipient of the communication. In another example, the contacts 128 can be ranked based on the number of communications between the user and the sender 112 for which a contact is also a recipient of the communication over the course of the last three weeks. In another example, the contacts 128 can be ranked based on the number of communications between the user and a contact for which the sender 112 is also a recipient of the communication.

In another example, the contacts 128 can be ranked based on the length of communications between the user and the sender 112 for which a contact is also a recipient of the communication with longer communications being ranked higher than shorter communications. In another example, contacts that are listed on communications flagged as urgent or important can be ranked higher than other contacts. In another example, the user can choose to have contacts who mainly communicate with the user or sender 112 using e-mail ranked higher than contacts who mainly communicate with the user or sender 112 using instant message or social networks. In another example, the system 100 can use the contents of communications involving each contact 128 and the sender 112 to determine if communications involving the contact 128 and the sender 112 are primarily business related or social related communications. The system 100 can then give a higher ranking to contacts associated with business communications than contacts associated with social communications.

In another example, contacts who are associated with more recent communications between the user and the sender 112 can be ranked higher than contacts associated with older communications between the user and the sender 112. In another example, contacts that have been determined to be associated with the sender 112 based on e-mail communication can be ranked higher than contacts that have been determined to be associated with the sender 112 based on web searches.

In some implementations, each contact 128 listed in the contact network 122 can be a link to more information about the contact 128. For example, if a contact 128 is clicked on, selected, or interacted with by the user, a profile containing information about the selected contact 128 can be displayed. In another example, the user can hover a mouse cursor or other selection tool over a contact 128. This can cause a pop-up bubble containing additional information about the contact 128 to be displayed.

The conversation list 124 can display a list of recent communications between the user and the sender 112 or involving the user and the sender 112. The communications displayed on the conversation list 124 can be a list of past e-mails, text messages, instant messages, telephone calls, social network communications, message board posts or voice over IP communications involving the sender 112. In some implementations, the conversation list 124 can be a list of recent conversation threads involving the sender 112. A conversation thread is a series of communications that can be grouped together. For example, a series of e-mails having the same or similar subjects can be grouped together as a conversation thread. In another example, a group of instant messages between the sender 112 and the user that occurred over a specific period of time can be grouped together as a conversation thread. For example, if the user sent and received a series of instant messages from the sender 112 over a three hour period earlier in the day, and that conversation was separated from another series of instant messages between the user and the sender 112 by a period of 2 hours, the instant messages that were sent and received during that three hour period can be grouped together as a conversation thread. In another example, a series of telephone calls between the user and the sender 112 that occurred during a set time period can be grouped together as a conversation thread.

The communications or conversation threads displayed in the conversation list 124 can be listed in order based on a ranking system. In one implementation, conversation threads can be listed in order of most recent communications to oldest communications. In another implementation, conversation threads can be listed in order of oldest to most recent. In another implementation, conversation threads can be listed in order of importance with conversation threads containing communications marked as urgent being ranked higher than conversation threads with fewer communications marked urgent or no communications marked urgent. In another implementation, the system 100 can determine which conversation threads are work related and which conversation threads are social. The conversation threads that are work related can then be ranked higher than the conversation threads that are social. In another implementation, conversation threads can be ranked based on the number of communications in the conversation thread.

Communications that are listed in the conversation list can include communications initiated by the sender 112, communications for which the sender 112 is a recipient, communications on which the sender 112 has been copied, or communications in which the sender 112 is mentioned.

In the example depicted in FIG. 1A, the conversation list 124 displays a list of recent conversation threads involving the user and the sender 112. The conversation threads displayed are for recent e-mail communications involving the user and the sender 112. The e-mails in each conversation thread are grouped by subject. The conversation list 124 displays the subject for each conversation thread, the number of e-mails in each conversation thread, and the amount of time that has passed since the last communication for this conversation thread was sent or received. In other implementations, additional information can be displayed for each conversation thread, including: time and date of the last communication in the conversation thread, time and date of the first communication in the conversation thread, other contacts involved in the conversation thread, average length of communications in the conversation thread, total number of people involved in the conversation thread, level of importance of the communications in the conversation thread, attachments shared in the conversation thread, calendar events related to the conversation thread, other forms of communication related to the conversation thread, relevant web data, or average response time of communications in the conversation thread.

In some implementations, the conversation list 124 can display a summary or the first few lines of the most recent communication for each conversation list. In another implementation, the conversation list 124 can display a summary or the first few lines of the first communication for each conversation list. In another implementation, the conversation list 124 can display a summary or the first few lines of the last communication initiated by the sender 112 for each conversation list.

The files exchanged list 126 displays a list of files that were attached to communications involving the user and the sender 112. This can include communications initiated by the user for which the sender 112 was a recipient, communications initiated by the sender 112 for which the user was a recipient, or communications initiated by a third party for which the sender 112 and the user were both recipients. The files exchanged list 126 can also include files that were exchanged between the user and the sender 112 with out using a communication medium. For example, the files exchanged list 126 can include files that were transferred from the sender 112's network drive to the user's computer or network drive. In another example, the files exchanged list 126 can include files that were transferred to the user's computer or network drive from an external hard drive, flash drive, or floppy disk belonging to or populated by the sender 112.

The files displayed in the files exchanged list 126 can be listed in order based on a ranking system. In one implementation, files can be listed in order of most recently received files to least recently received files. In another implementation, files can be listed in order of oldest to most recent. In another implementation, files can be listed in order of importance, with files that were attached to communications marked as urgent being ranked higher than files attached to communications that were not marked as urgent. In another implementation, the system 100 can determine which files are work related and which files are personal. The files that are work related can then be ranked higher than the files that are personal. In another implementation, files can be ranked based on the size of the files.

In some implementations, the files displayed in the files exchanged list 126 can be grouped together. The files can be grouped together based on the subject of the communications to which the files were attached, file name, file title, date of the file, date of the communication, file type, or subject matter of the file. For example, if a document has undergone several rounds of revisions, the different versions of the document can be grouped together so that the different versions of the document can be easily compared to one another. In another example, a number of files about rain forests can be grouped together since they all contain related subject matter. In another example, all image files can be grouped together so that they can be more easily viewed, or easily put into a slide show. For example, a group of image files can be displayed as a slide show and each slide can contain additional information about the image being displayed, such as who sent the image, recipients of the image, the date the image was sent or received, or other information drawn from one or more communications to which the image was attached.

In some implementations, the profile 108 can include additional information about the selected e-mail 110. The system 100 can extract information from the e-mail 110 and use this information to gather and display data from websites, search engines, or other sources of information. For example, the e-mail 110 may contain information about travel arrangements. The e-mail 110 can be an e-mail from an airline, travel agent, travel website or other source. If the e-mail 110 contains information about a flight, such as a flight number, an airline, a departure time, an arrival time, a departure city, or an arrival city, the system 100 can use this information to query search engines or travel websites for information about the flight. This information can include expected departure time, expected arrival time, expected delays, weather in the destination city, weather in the departure city, or any changes to the flight. This information can then be displayed as part of the profile 108. This allows the user to see when changes to travel arrangements have occurred, and easily contact a travel company or airline in order to correct the situation.

In another example, the e-mail 110 can contain information about a purchase from an on-line retailer. The e-mail 110 can contain shipping information, shipping status, or order information. If the e-mail 110 contains a shipping number for the shipment of a recently purchased item, the system 100 can query a search engine or shipping web site to extract information about the current status and expected arrival of the item. This information can then be displayed as part of the profile 108.

In another example, the e-mail 110 can contain information about an item or service that the user is interested in purchasing. The system 100 can query one or more search engines, websites, or on-line retailers to determine which retailer or website has the best price or currently has the item in stock or the service available. This information can then be displayed as part of the profile 108.

Figure 1B:
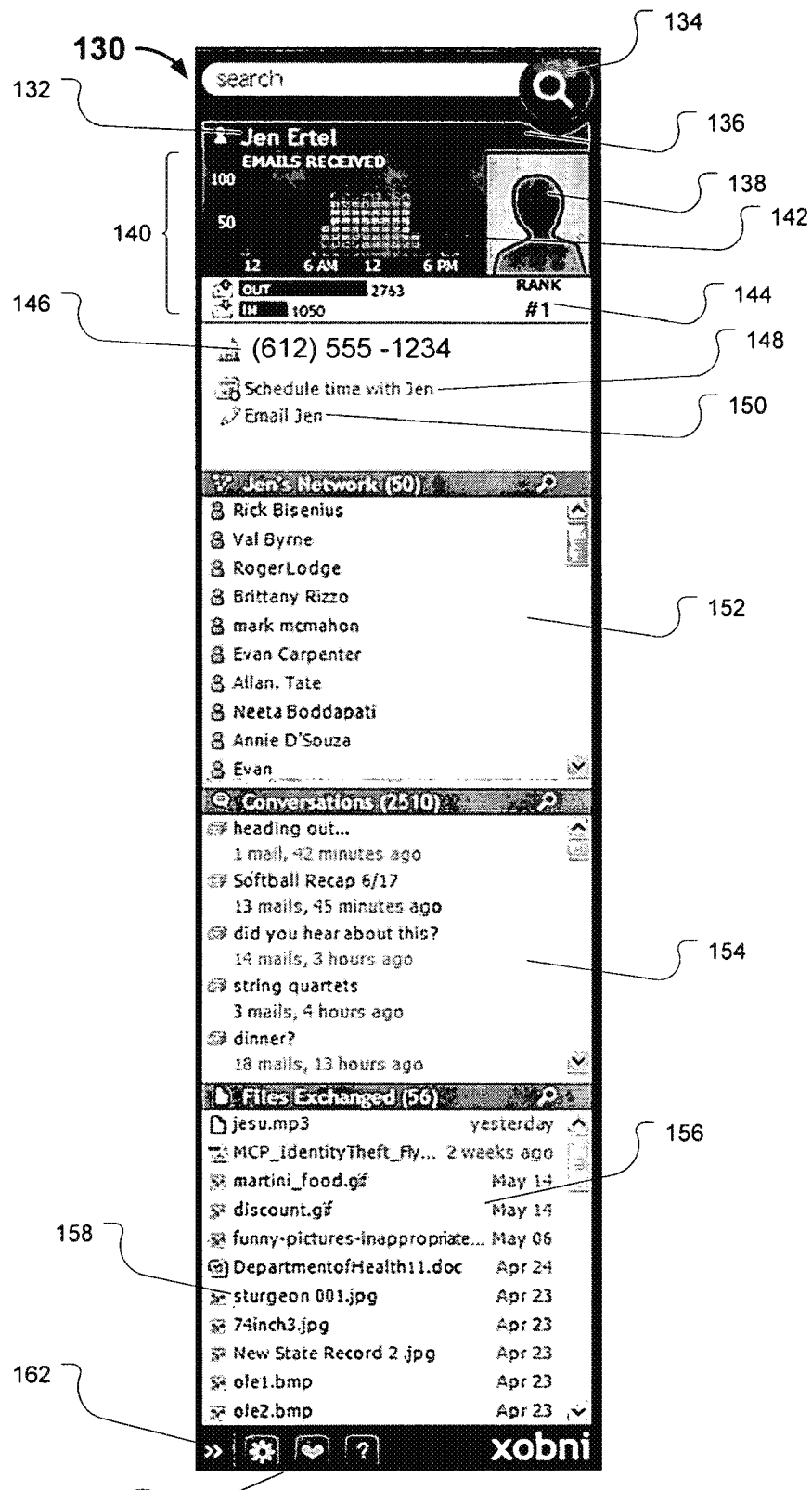
FIG. 1B shows an example of a profile.

FIG. 1B shows a profile 130 for a person 132 named "Jen Ertel". The profile 130 for the person 132 can be displayed in response to an action by a user that indicates either an implicit or direct request to view the profile 130 of the person 132. Actions by the user that can cause the profile 130 for the person 132 to be displayed can include viewing or selecting a communication sent by the person 132, viewing or selecting a communication for which the person 132 is listed as a recipient, composing or initiating a communication with the person 132, selecting or clicking on a name, screen name, or e-mail address of the person 132, or performing a search for information related to the person 132.

The profile 130 includes a search bar 134. The search bar 134 can be used to request that information be displayed about a particular person, topic, conversation thread, communication, or file. For example, a search performed using the search bar 134 and the search string "Allan Tate" can result in a profile for a person named Allan Tate being displayed. In another example, a search using the search string "sunday_presentation.ppt" can result in information about a file named "sunday_presentation.ppt" being displayed. In another example, a search using the search string "2002 Sales Goals" can result in information to be displayed regarding communications with the subject "2002 Sales Goals", containing the phrase "2002 Sales Goals", or having attachments that contain the phrase "2002 Sales Goals".

Search criteria that can be used to identify a profile can include names, screen names, social network profile names, social network profile URLs, physical addresses, website URLs, e-mail addresses, e-mail subject lines, file names, or telephone numbers. For example, a search using the search string "allan.tate@example.com" can result in a profile for a person named "Allan Tate" being displayed. In the example depicted in FIG. 1B, a search for the phone number "(612) 555-1243" may have been performed in-order to display the profile 130 for the person 132 named "Jen Ertel".

The profile 130 can include a title bar 136. The title bar 136 can display a name, a nick name, a screen name, a primary e-mail address, or other identifying title for the person 132 so that the user can easily identify who the information in the profile 130 is related to.

The profile 130 can also include an image 138. The image 138 can be a picture of the person 132 to help the user more easily identify who the information in the profile 130 is related to or to help the user identify whom he or she is communicating with. For example, if the user receives an instant message from a person with the screen name "summergirl" the user may not be able to remember who this screen name belongs to. When the instant message is received, the profile 130 can display information about the person with the screen name "summergirl" including a picture of the person as the image 138. This can help the user to identify whom he or she is communicating with. The image 138 can also be an image, icon, or picture associated with the person 132. The image, icon, or picture can be used to identify the person 132 as a business contact, co-worker, friend, social acquaintance, client, or contractor. For example, all of the profiles 130 for contacts from a particular company can display a logo for that company. This can help the user to quickly identify what relationship he or she has with these particular contacts.

The image 138 can be added to the profile 130 by the user, or it can be automatically extracted from a communication with the person 132 or from a website or profile page belonging to or about the person 132. For example, if a social network screen name or URL for the person 132 is known, an image from the person 132's social network profile page can be extracted and used as the image 138. In another example, if instant message communications with the person 132 include an icon that identifies the person 132, this instant message icon can be extracted and used as the image 138.

The profile 130 can include communication statistics 140 about communications involving the person 132. These communication statistics 140 can include the statistics as previously described for FIG. 1A. In the example shown in FIG. 1B, one of the communication statistics 140 displayed is a graph 142 showing what times of day communications are received from the person 132 and the relative volume received from the person 132 at each time of day. This can help the user to determine when, or how quickly the person 132 will respond to a new communication from the user. For example, if the user lives in the United States and the person 132 lives in Germany, most of the communications received from the person 132 may occur between 5:00 am and 10:00 am of the user's local time. The graph 142 can easily display this information so that the user can determine when to reasonably expect a response to a recent communication from the person 132.

Other communication statistics 140 displayed in the profile 130 in FIG. 1B include the total number of communications received from the person 132, the total number of communications sent to the person 132, and a rank 144. The rank 144 can be the rank of the person 132 compared to all other persons that the user communicates with. The rank 144 can be based, for example, on total communications exchanged, total number of attachments exchanged, total number of communications sent, total number of communications received, length of communications or importance of communications.

Communication statistics 140 can be displayed as graphs or charts as shown in FIG. 1B, or as text. In some implementations, statistics can be displayed in the profile 130 or in an additional panel or pop-up window as "fun facts". For example, when viewing a profile for someone named "Matt Miller", the profile can display a message that reads "Matt's birthday is next week". In another example, a pop-up bubble with the message "Your last communication with Matt was 21 days ago" can be displayed. In another example, a panel can display a message reading "You send Matt 20 times as many messages as he sends you."

Another example of a fun fact that can be displayed is "Matt is your 5.sup.th most e-mailed contact". Another example of a fun fact that can be displayed is "your most e-mailed contact is Steve.'. Another example of a fun fact that can be displayed is "the fastest responder to your communications is Garrett." The fun facts can include any combination of communication statistics, communication information, contact information, or contact statistics.

In some implementations, communication statistics 140 can be shared with other persons. For example, the user can choose to share communication statistics with the person 132. The person 132 will then be able to view communication statistics 140 about his or her communications with the user. In some implementations, the user can indicate that one or more persons are trusted contacts. Communication statistics 140 can be automatically shared with all persons indicated as trusted contacts. Other information, such as calendar information, contact information, or contact network information can also be shared with trusted contacts.

The profile 130 can include contact information 146. The contact information 146 displayed can include e-mail addresses, telephone numbers, screen names, social network profile names, social network profile URLs, physical addresses, facsimile numbers, or website URLs. The contact information 146 can be collected from a variety of sources including communications between the person 132 and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, profile pages, telephone communications, or customer relationship management systems. For example, when the user receives an e-mail from a person, that person's e-mail address can be added to the list of contact information 146 for that person's profile 130. In another example, when the user makes a phone call to a person, that person's telephone number can be added to the list of contact information 146 for that person's profile 130.

In some implementations, contact information 146 can be extracted from the body, subject, or meta data of a communication between the user and the person 132. For example, if the user receives an e-mail from the person 132 with a signature block at the end that includes a telephone number, facsimile number, and screen name for the person 132, this contact information can be extracted from the e-mail and added to the list of contact information 146 for the person 132's profile 130. In another example, an e-mail from a person can include an address for the person in the body of the e-mail or in an attachment to the e-mail, this address can be extracted from the e-mail or attachment and added to the list of contact information 146 for that person's profile 130. In another example, the person 132 can leave a social network post for the user telling the user the person 132's instant message screen name, this screen name can be added to the list of contact information 146 for the person 132's profile 130.

In some implementations, contact information 146 for the person 132 can be extracted from a communication from a third party. For example, the user can receive an e-mail from Bill that contains the text "Mary's cell phone number is 608-555-5353". This phone number can be extracted from Bill's e-mail and added to the list of contact information 146 for Mary's profile 130. In another example, the user can receive an e-mail with an attachment that contains a list of telephone numbers, e-mail addresses, and office numbers for everyone in the user's office. The telephone number, e-mail address, and office number for each person listed on the attachment can be extracted and added to the list of contact information 146 for the profiles 130 of each person listed on the attachment.

Contact information 146 can be extracted from multiple sources, including multiple e-mail clients, multiple web mail systems, multiple instant message clients, multiple telephone numbers, multiple social networks, or multiple web pages.

In some implementations, contact information 146 can be collected using search engines, telephone directories, or people search engines. Search criteria can include e-mail addresses, names, screen names, social network profile names, phone numbers, personal website URLs, social network profile URLs, facsimile numbers or physical addresses. For example, a search of a telephone directory or people search engine for "Rex Banner" can return a telephone number for Rex Banner. This telephone number can then be added to the list of contact information 146 for Rex Banner's profile 130. In another example, a people search or web search for the e-mail address "alewis@example.com" can return a URL for a social network profile for Adam Lewis. The name "Adam Lewis" can then be associated with the e-mail address "alewis@example.com" in a profile 130. In addition, the social network profile URL and social network screen name for Adam Lewis can be added to the list of contact information 146 for Adam Lewis's profile 130. Furthermore, additional contact information, that is listed on the social network profile for Adam Lewis, such as additional e-mail addresses, phone numbers, instant message screen names, etc., can be extracted from the social network profile and added to the list of contact information 146 for Adam Lewis's profile 130.

In another example, a web search or person search for a person can return a photo or video sharing website profile for the person. The URL or screen name for the person's photo or video sharing website profile can be added to the list of contact information 146 for the person's profile 130. In addition, the photo or video sharing website may contain additional contact information for the person that can be extracted and added to the list of contact information 146 for the person's profile 130.

In another example, contact information 146 for the person 132 can include an e-mail address "jertel@examplecompanyltd.com". A web search can be performed to identify the website associated with the e-mail extension "examplecompanyltd.com". For example, this e-mail extension can be associated with a company called "Example Company ltd.". The website for Example Company ltd. can then be searched for information about the person 132. The website may include a profile page for the person 132 that includes contact information that can be added to the list of contact information 146 for the person 132's profile 130. In addition, the URL for the profile page can be added to the list of contact information 146 for the person 132's profile 130.

In some implementations, the address for a person can be used to refine the search results for that person by constricting the results to information about persons in a specific geographic area. For example, if a search is being performed for information on a person with a common name, such as "Bill Johnson", and Bill Johnson's address is known, the search results can be refined by restricting the results to information about person's named Bill Johnson in the city of the known address. In some implementations, other information about a person can be used to refine search results for that person.

In some implementations, contact information can be extracted from a shared network drive or through a secure connection. In some implementations, contact information can be automatically shared between systems. For example, the person 132 can elect to share contact information with all people in a trusted network, such as all people with e-mail extensions from the same company. A computer belonging to the person 132 can then automatically send contact information to all trusted people. If the user is in the network of trusted people, the person 132's contact information will automatically be shared with a computer or system belonging to the user.

In some implementations, contact information for the person 132 can be manually added or removed from the profile 130 by the user. In some implementations, contact information for the person 132 can be manually added or removed from the profile by the person 132 or by a third party. In some implementations, the user can choose which contact information for each person is displayed in that person's profile.

In some implementations, when a mouse cursor or other selection tool is hovered over/indicates a piece of contact information in the list of contact information 146, a pop-up bubble or other indicator can be displayed which indicates the source from which the piece of contact information was received or extracted. For example, if a phone number has been extracted from an e-mail, a hover bubble can be displayed which shows the e-mail or a portion of the e-mail where the phone number was extracted with the extracted info highlighted or demarcated in some way.

In some implementations, the user can be allowed to validate contact information in the list of contact information 146. Validated contact information can be indicated as validated, and un-validated contact information can be indicated as un-validated. For example, if a phone number for the person 132 is extracted from an e-mail, the user can look at the phone number to determine if it is indeed the correct phone number for the person 132. If the user believes that the phone number is correct, the user can choose to validate the phone number. The phone number can then be displayed along with an indication that it has been validated, such as with a check mark icon, or text that reads "valid". If the user is unsure if the phone number is correct, or has not taken the time to validate the phone number, the phone number can be displayed with an indication that it has not been validated, such as with a question mark icon, or the text "not validated".

In some implementations, presence of the person 132 can be indicated for some or all of the contact information on the list of contact information 146. For example, an indicator next to a person's instant message screen name can indicated if the person is currently logged onto the related instant message network. In another example, an indicator next to a person's social network screen name or URL can indicate if the person is currently logged onto the related social network or if the person has made a recent update to his or her social network profile. In another example, an indicator next to a person's e-mail address can indicate if the person has put up an away message or out of the office message.

In some implementations, the profile 130 can display information about the person 132's current location. If the person 132 is in possession of a GPS unit, GPS enabled phone, or other location detection device, the person 132 can choose to share his or her location information. There are several services that allow a person to share location information with other people. The person 132 can choose to share his or her location information with the user. The profile 130 can then display the current location of the person 132. This location information can be displayed as an address, map coordinates, or a graphic of a map with an icon to indicate the person 132's present location.

Other information about the person 132 that can be displayed on the profile 130 can include birthday, gender, age, job title, employer, universities attended, family information, or other biographical data. Information from Customer Relationship Management Systems (CRMs) about or related to the person 132 can also be displayed in the profile 130. Information about calendar items or scheduled meetings related to the person 132 or related to a communication can also be displayed as part of the profile 130.

In some implementations, information from one or more websites can be displayed as a chronological feed of information in the profile 130. This information can be queried on the web via one or more search engines or from one or more specific websites through established associations between the person 132 and the one or more websites. For example, this information can be found by general searching, people searching, or querying websites where it has been established that the person 132 is generating content or is the subject of content on the website. Search terms for these searches can include e-mail addresses, names, screen names, social network profile names, phone numbers, personal website URLs, social network profile URLs, or physical addresses. Information that is extracted from communications with the person 132 can also be used as search criteria.

The profile 130 can include a schedule time link 148. The user can click on/interact with the schedule time link 148 to send a communication to the person 132 to request a meeting or to send the user's schedule to the person 132. For example, clicking on the schedule time link 148 can cause an e-mail to be automatically composed that is addressed to the person 132 that contains all of the times over the course of the next week that the user is available during business hours. This schedule information can be extracted from a calendar associated with an e-mail client, web mail account, social network account, instant messaging program, telephone, personal digital assistant (PDA), or website belonging to the user or associated with the user. In addition, schedule information can be extracted from a calendar stored on a computer, network drive, or other data storage location belonging to or associated with the user. In one implementation, clicking on the schedule time link 148 can cause a communication to be sent to the person 132 requesting schedule information from the person 132.

The profile 130 can also include one or more initiate communication links 150. In the example shown in FIG. 1B, the initiate communication link 150 displayed will cause an e-mail addressed to the person 132 to be automatically generated when it is clicked on. Other forms of communication that can be initiated using an initiate communication link 150 include telephone calls, instant messages, text messages, social network messages, social network posts, message board posts, facsimiles, or voice over IP communications. For example, the profile 130 can include a "call Jen" link that can cause the user's cell phone to dial Jen's phone number when clicked on. In another example, the profile 130 can include an "instant message" link that when clicked on, can cause an instant message program to automatically open and generate an instant message addressed to a screen name of the person 132.

The profile 130 can include a contact network 152. The contact network 152 can include a list of contacts associated with the person 132. The contact network 152 can be populated using the methods previously described in the description of FIG. 1A. The profile 130 can also display the total number of contacts associated with the person 132 in the contact network 152. In the example shown in FIG. 1B, the contact network 152 displayed in the profile 130 indicates that there are 50 contacts in Jen's contact network 152.

Clicking on, selecting, or interacting with one or more contacts from the contact network 152 can cause one or more actions to occur. In one implementation, selecting a contact from the contact network 152 can cause a profile for that contact to be displayed. In another implementation, selecting one or more contacts from the contact network 152 can cause a communication directed to the selected contacts to be initiated. For example, selecting three contacts from the contact network 152 can cause an e-mail addressed to the three contacts to be generated. In another example, clicking on three contacts from the contact network 152 can cause the user's telephone to initiate a conference call with the selected contacts. In another implementation, selecting one or more contacts from the contact list can cause a communication directed to the selected contacts and the person 132 to be generated.

In other implementations, selecting a contact from the contact network 152 can cause the most recent communication or conversation thread between the user and the selected contact to be displayed. In another implementation, selecting a contact from the contact network 152 can cause the most recent communication or conversation thread involving the contact, the person 132, and the user to be displayed. In some implementations, moving a mouse cursor over a contact in the contact network 152 can cause information about the contact to be displayed. For example, moving a cursor over a contact can cause a small pop-up bubble to appear that displays the contact's phone number, e-mail address, or other contact information. In some implementations, contacts can be manually added or removed from the contact network 152 by the user.

The profile 130 can include a conversation list 154 that includes a list of recent communications or conversation threads involving the user and the person 132 as previously described in the description of FIG. 1A. The conversation list 154 can display the total number of communications or conversation threads involving the user and the person 132. In the example shown in FIG. 1B, the conversation list 154 indicates that 2510 conversation threads have occurred that involved the user and the person 132.

Clicking on or selecting a conversation thread or communication in the conversation list 154 can cause a more detailed summary of the conversation thread or communication to be displayed. For example, selecting a conversation thread can cause a summary of one or more communications in the conversation thread to be displayed. In another example, selecting a communication in the conversation list 154 can cause a summary of the communication to be displayed. In another implementation, selecting a communication in the conversation list 154 can cause the communication to be displayed. For example, selecting an e-mail from the conversation list 154 can cause the e-mail to be displayed.

In another implementation, selecting a conversation thread can cause the most recent communication to be received or the most recent communication to be sent in that conversation thread to be displayed. In another implementation, selecting a conversation thread in the conversation list 154 can cause the first communication in that conversation thread to be displayed. In another implementation, selecting a conversation thread from the conversation list 154 can cause a communication addressed to all of the participants of the conversation thread to be generated. For example, selecting an e-mail conversation thread can cause an e-mail to be automatically generated that is addressed to all of the e-mail addresses involved with the selected conversation thread. In some implementations, communications or conversation threads can be manually added or removed from the conversations list 154 by the user The profile 130 can include a files exchanged list 156. The files exchanged list 156 can contain a list of files exchanged between the user and the person 132 as previously described in the description of FIG. 1A. For each file listed in the files exchanged list 156, the profile 130 can display a file name, a file title, an icon, the time or date when the file was received, the amount of time that has elapsed since the file was received, the subject of the communication to which the file was attached, or other information about the file. Icons displayed next to a file name or file title can indicate what type of document the file is. In the example depicted, a file 158 with the file name "sturgeon 001.jpg" is displayed. An icon next to the file name for the file 158 indicates that the file 158 is a picture file. A date next to the file name indicates that the file 158 was received on April 23.

Clicking on or selecting a file in the files exchanged list 156 can cause the file to open. In another implementation, selecting a file can cause the communication to which the file was attached to be displayed. In another implementation, selecting a file can cause a list of files with the same file name to be displayed. This allows the different versions of a document that has undergone several rounds of revisions to be reviewed and compared to each other. In another implementation, selecting a file can cause a summary of the file to be generated and displayed. For example, hovering a cursor over a file in the files exchanged list 156 can cause an information bubble containing the title and first few lines of the file to be displayed. This list of files can include a time and date stamp for each version of the file so that the most recent revision can be easily identified. In some implementations, files can be copied from the files exchanged list 156 to other locations. In some implementations, files can be manually added or removed from the files exchanged list by the user.

The profile 130 can include one or more menu buttons 160. The menu buttons can be used to change personal settings or preferences, change viewing preferences, or access menus or help information. The profile 130 can also include a minimize button 162 that can cause the profile 130 to minimize or close. When the minimize button 162 is clicked or selected, a minimized version of the profile 130 that takes up less space in a viewing window can be displayed. The minimized version of the profile 130 can include a summary of some or all of the information displayed by the profile 130.

Figure 1C:
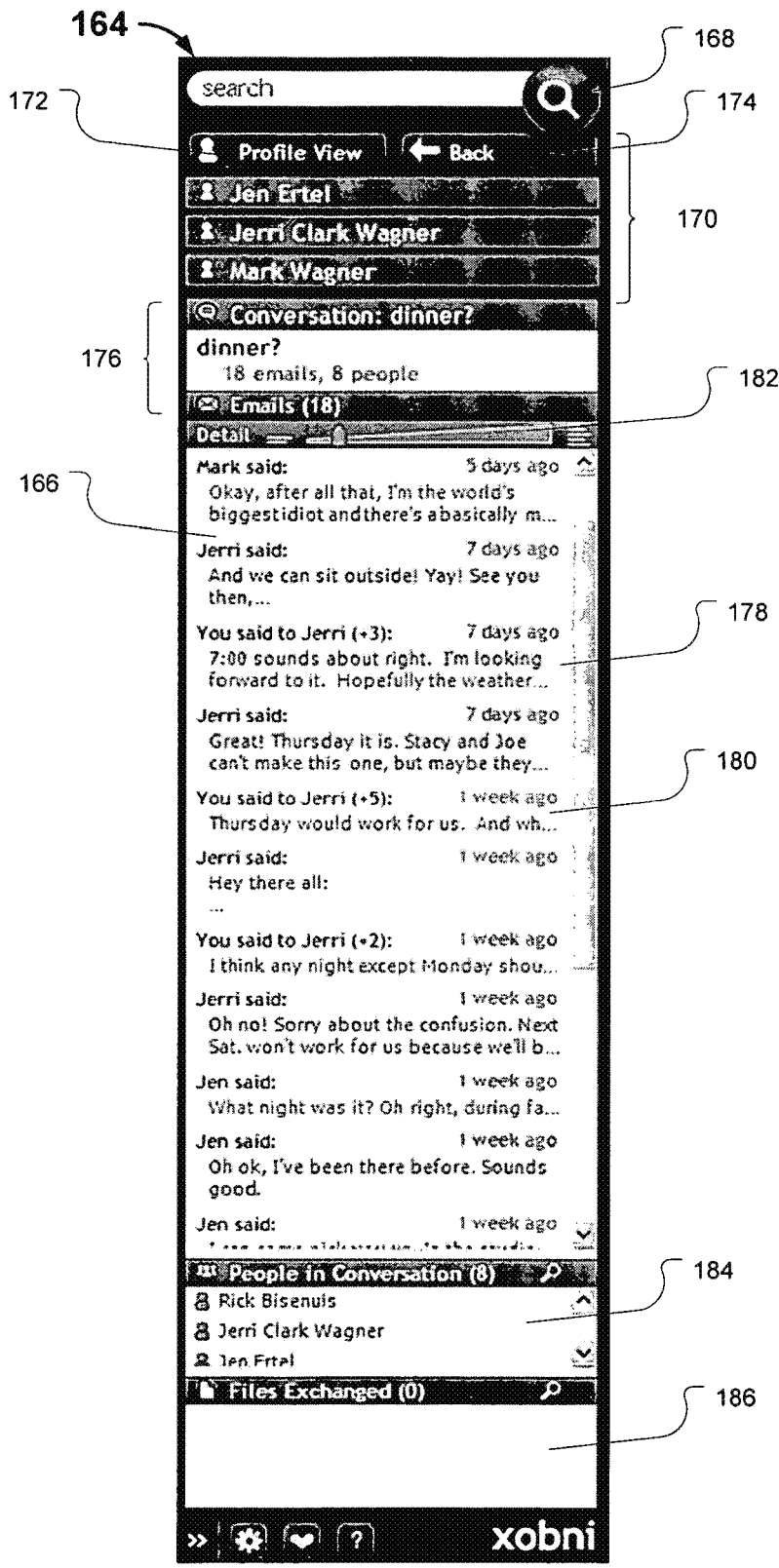
FIG. 1C shows an example of a conversation thread profile.

FIG. 1C shows a viewing panel 164. The viewing panel 164 can display a profile such as the profile 130 of FIG. 1B. The viewing panel 164 can also display information about communications, communication attachments, files, or conversation threads. In the example shown in FIG. 1C the viewing panel 164 displays information about a conversation thread 166. The information about the conversation thread 166 can be displayed in response to a user clicking on a conversation thread 166 in a conversation list, such as the conversation list 154 from FIG. 1B. The conversation thread 166 can also be displayed in response to the user viewing, reading, selecting, opening, or writing a communication that is part of the currently displayed conversation thread 166. In some implementations, the conversation thread 166 can be displayed in response to a search performed by the user. For example, the user can use a search bar 168 to search for a conversation thread 166 based on the subject of the conversation thread 166, participants in the conversation thread 166, files attached to communications in the conversation thread 166, or key words or terms in the communications of the conversation thread 166.

The viewing panel 164 can include one or more navigation buttons 170. The navigation buttons 170 can include a profile view navigation button 172. The profile view navigation button 172 can be used to return the viewing panel 164 to a profile view so that the viewing panel 164 displays information about the sender or recipient of a currently selected communication, or another person as indicated by the user. The navigation buttons 170 can also include a back button 174. The back button 174 can be used to display a profile, conversation thread, or other information that was previously displayed in the viewing panel 164. For example, if the user was previously viewing a profile for a person named Mark Wagner, clicking on the back button 174 can cause the viewing panel 164 to display the profile for Mark Wagner. In another example, if the user was previously viewing information about an e-mail attachment, clicking on the back button 174 can cause the viewing panel 164 to display the previously viewed e-mail attachment information.

The navigation buttons 170 can also display a navigation history that has lead to the current information being displayed in the viewing panel 164. In the example shown in FIG. 1C, the navigation buttons 170 indicate that the user first viewed a profile for Jen Ertel. The user then viewed a profile for Jerri Clark Wagner. The user may have opened the profile for Jerri Clark Wagner by clicking on the name Jerri Clark Wagner in a contact network or list of contacts on Jen Ertel's profile, or by performing a search for Jerri Clark Wagner, or other information associated with Jerri Clark Wagner. The navigation buttons 170 indicate that the user then viewed a profile for Mark Wagner. The user may have caused the current conversation thread 166 to be displayed by clicking on a conversation thread in a conversation list similar to the conversation list 124 from FIG. 1A. In some implementations, clicking on or selecting any of the buttons in the navigation history can cause the viewing panel 164 to display the profile, conversation thread, communication, communication attachment, or other information associated with the selected navigation button 170.

The viewing panel 164 can include a title bar 176. The title bar 176 can include the type of information being displayed in the viewing panel, the subject, and other key information. When the information being displayed in the viewing panel 164 is a conversation thread 166, the title bar 176 can indicate that a conversation is being viewed, the title or subject line of the conversation thread, the number of communications involved in the conversation thread, the types of communications involved in the conversation thread, or the number of people involved in the conversation thread. In the example shown, the title bar 176 indicates that a conversation is being viewed, that the subject line of the communications in the conversation thread 166 is "dinner?", that there are 8 people involved in conversation thread 166, that 18 communications are included in the conversation thread 166, and that all 18 communications are e-mails.

The viewing panel 164 can include a summary of some or all of the communications 178 that make up the conversation thread 166. Information displayed as part of the summary for each communication 178 can include the sender of the communication 178, the recipients of the communication 178, the time or day that the communication 178 was sent or received, attachments to the communication 178, the first few lines or sentences of the communication 178, the importance of the communication 178, or the number of recipients of the communication 178. For example, an e-mail summary 180 indicates that the user sent an e-mail in response to an e-mail from Jerri 1 week ago and that 5 additional recipients were also listed on the e-mail. The e-mail summary 180 also displays the first lines of the e-mail sent to Jerri.

In some implementations, clicking on or selecting a communication summary in the conversation thread 166 can cause the related communication to be displayed. For example, clicking on the e-mail summary 180 can cause the e-mail sent from the user to Jerri to be displayed. In another example, selecting a communication summary in the conversation thread 166 can cause a profile for the sender or one or more recipients of the related communication to be displayed. In another example, selecting a communication summary in the conversation thread 166 can cause one or more attachments or a list of attachments to the related communication to be displayed. In another implementation, selecting a communication summary in the conversation thread 166 can cause a communication addressed to the sender or one or more recipients of the related communication to be automatically generated. In some implementations, selecting a communication summary in the conversation thread 166 can cause a more detailed summary for the related communication to be displayed.

The viewing panel 164 can include a detail adjustment control 182. the detail adjustment control 182 can be used to modify the amount of detail that is displayed in each communication summary in the conversation list 166. In one implementation, adjusting the detail adjustment control 182 can increase or decrease the number of words or lines of a body of a communication that are displayed in each communication summary. In another implementation, adjusting the detail adjustment control 182 can increase or decrease the amount of information that is displayed for each communication summary. For example, the detail adjustment control can be changed to display an e-mail address and phone number for each sender or recipient of each communication 178 in the corresponding communication summary. In another example, the detail adjustment control 182 can be used to control what information is used to identify senders or recipients of communications 178 in each communication summary. Information used to identify senders or recipients can include names, nick names, screen names, e-mail addresses, telephone numbers, social network profile names, or company names.

In some implementations in which some or all of the communications that make up a conversation thread 166 are telephone calls or voice over IP communications, audio recordings of some or all of the telephone calls or voice over IP communications can be displayed in the conversation thread 166. Clicking on or selecting a telephone call or voice over IP communication in the conversation thread 166 can cause an audio recording of the communication to play. In some implementations, automatically or manually created transcripts of telephone calls or voice over IP communications that make up part or all of a conversation thread 166 can be displayed. In some implementations, a summary of a transcript of the audio communication can be displayed as part of a communication summary in the conversation thread 166. Clicking on or selecting a communication summary of a telephone call or voice over IP communication for which a transcript exists can cause the full transcript of the audio communication to be displayed, or an audio file of the audio communication to play.

The viewing panel 164 can include a conversation participants list 184. The conversation participants list 184 can be a list of senders and recipients of the communications 178 that make up the conversation thread 166. Information about each participant in the conversation thread 166 can be displayed, including name, contact information, number of communications initiated in the displayed conversation thread 166, and other relevant information. The conversation participants list 184 can also indicate the total number of participants involved in the conversation thread 166.

In some implementations, clicking on or selecting a person listed in the conversation participants list 184 can cause a profile for the selected person to be displayed. In another implementation, selecting a person from the conversation participants list 184 can automatically generate a communication addressed to the selected person. In another implementation, selecting a person from the conversation participants list 184 can cause all communications or summaries of communications from the current conversation thread 166 that were initiated by the selected person to be displayed.

The viewing panel 164 can include a files exchanged list 186. The files exchanged list 186 can display a list of files that have been exchanged in the current conversation thread 166. For example, the files exchanged list 186 can list all of the files that have been attached to communications 178 in the conversation thread 166. Clicking on or selecting a file from the files exchanged list 186 can cause the selected file to open. In another implementation, selecting a file from the files exchanged list 186 can cause one or more communications to which the file was attached to be displayed. In another implementation, selecting a file from the files exchanged list 186 can cause one or more communication summaries for communications to which the file was attached to be displayed.

Figure 2:
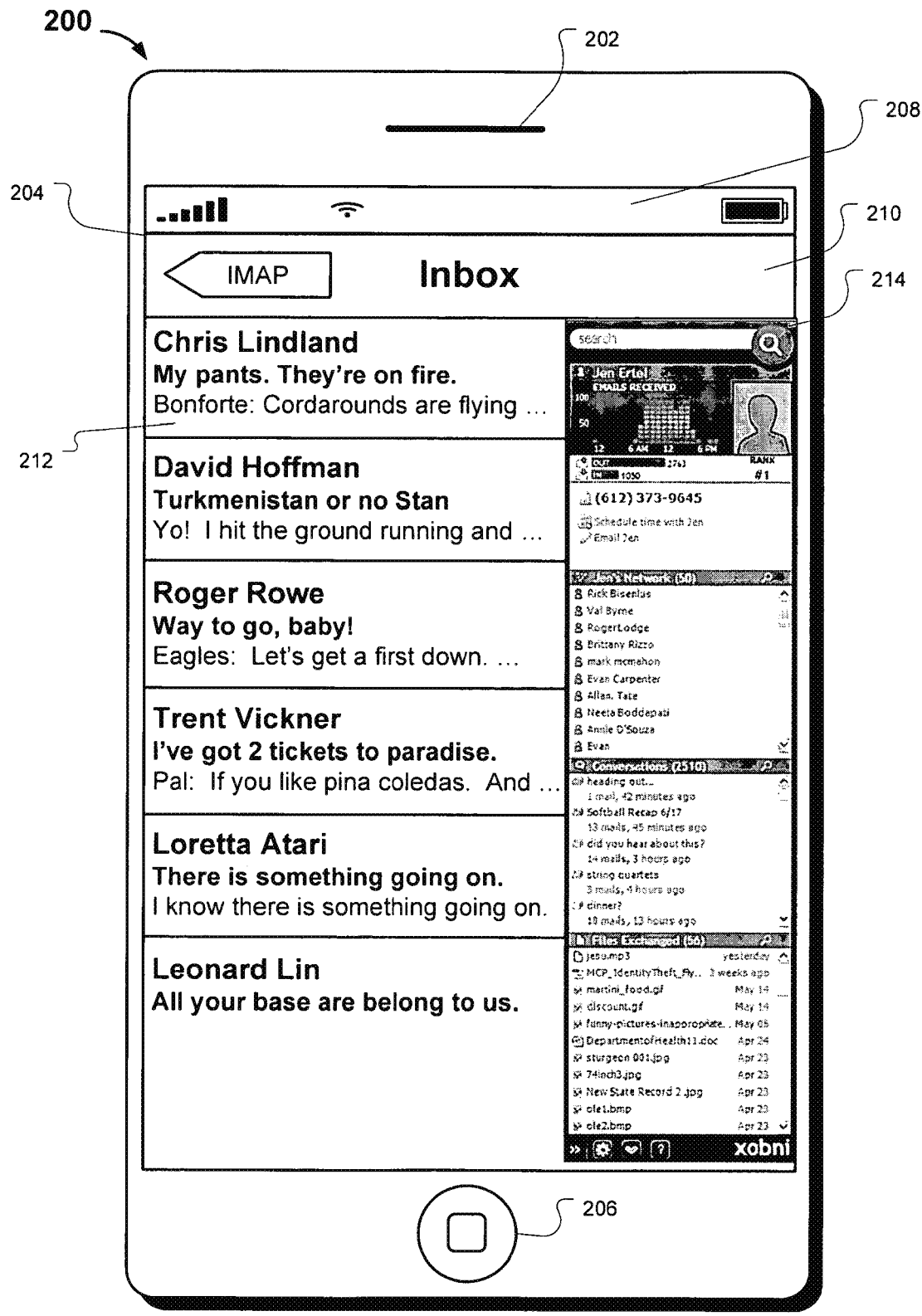
FIG. 2 is a block diagram of an example mobile device.

FIG. 2 is a block diagram of an example mobile device 200. In this example, the mobile device 200 includes an earpiece 202 for listening to audible sounds and conversations; a display 204 for viewing information available to the device 200; and a control mechanism 206 used for selecting and highlighting information, launching applications, answering telephone calls or other operations on the device 200.

In some implementations, the display 204 can include a touch-sensitive screen allowing access to information by pressing a user's fingertip in a desired area of the display 204, pressing a stylus or using other devices to apply pressure to the display. In some implementations, operations can be performed on the mobile device 200 by speaking voice commands. In some implementations, operations can be performed on the mobile device 200 by connecting to the mobile device 200 to an external device, such as, a wireless keyboard or a wireless mouse.

In some implementations, the display 204 can provide views to information stored on or presented by the mobile device 200. This information can include battery power status, telephone reception strength, alerts indicating new email messages or phone calls received, conversation data, and person data. Mobile device 200 shows a status bar 208 that provides a status for telephone reception strength, wireless data capability and battery power as examples. Other information can be displayed in the status bar 208 to provide a reference to the user.

Mobile device 200 includes an application status area 210 for displaying a convenient name, title or other heading representing an active application. For example, the device shown in FIG. 2 is displaying an email application inbox, and the application status area 210 shows "Inbox" as the title of the active application.

Mobile device 200 includes a viewing area 212 for displaying, in this example, email messages stored in an email account. The email messages may be stored locally in the memory of the mobile device 200 or remotely on another computer, server or file system. In some implementations, the email application may be triggered or launched when a new message is received by the mobile device 200. In some implementations, the email application may be launched by a user of the mobile device 200.

Other types of user interfaces associated with applications or programs may be displayed on the mobile device 200 in the display 204. For example, the mobile device 200 may include a mobile phone application and an incoming phone call may trigger the launch of a phone application interface to display the contact information for the caller in the display 204. The display of this contact information is depicted and described later for FIG. 4A.

In some implementations, the mobile device 200 can include a side bar 214 viewing area similar to the side bars described for FIGS. 1A-1C. In some implementations, the side bar 214 may be displayed on a layer over top of the active application. For example, the side bar 214 may be implemented as a stand-alone application that can be moved or "dragged" around on the display area of the display 204. In this example, the active email application can be partially or completely hidden behind the side bar 214. In other implementations, the side bar 214 can be displayed in the display area 204 by displaying the side bar 214 in proximity to the user interface associated with the active application. For example, the email application depicted for FIG. 2 may share the available space for the display 204. In some implementations, the user interface associated with the side bar 214 can be initiated or dismissed based on user actions or prompts.

Figures 3A, 3B:
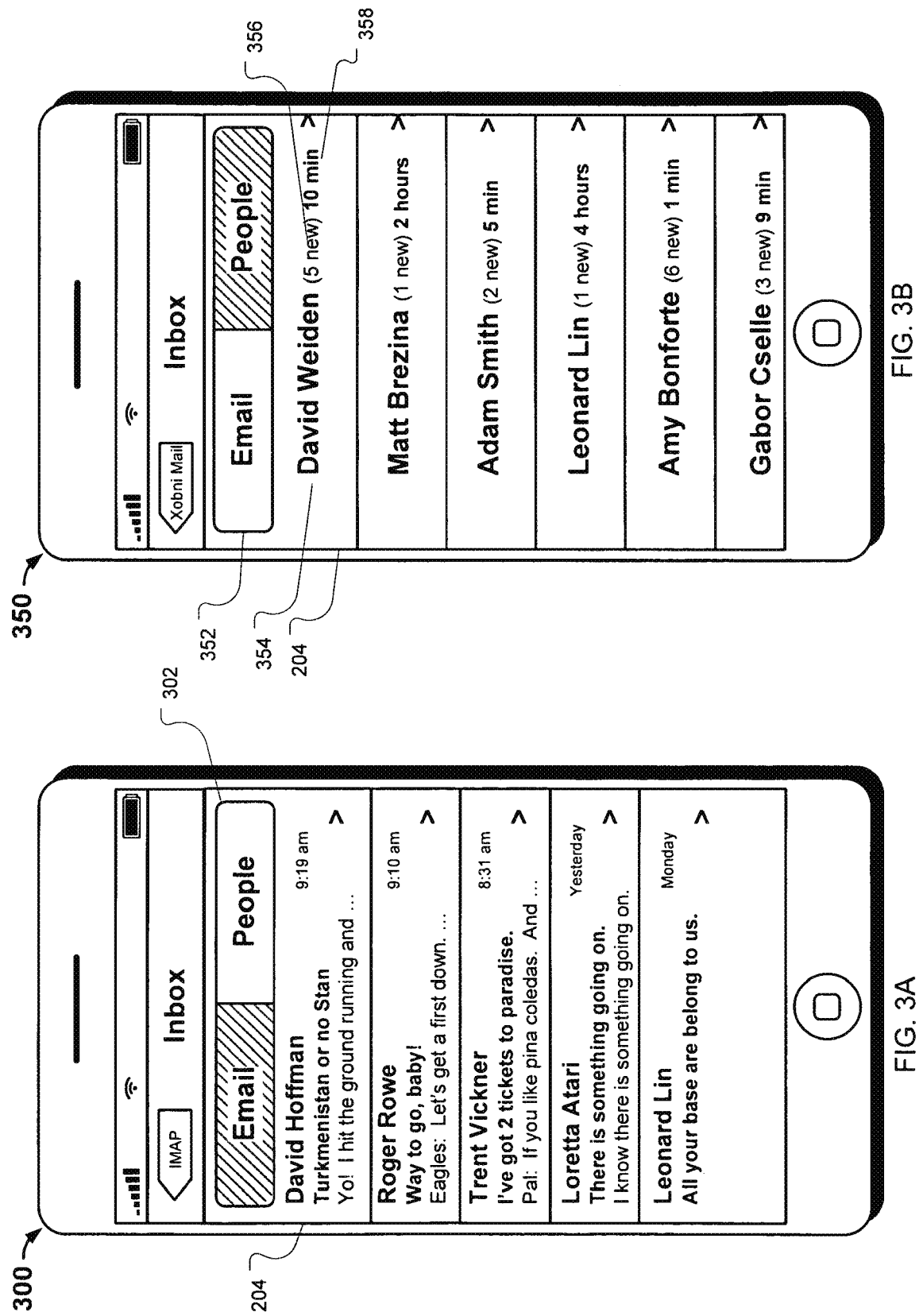
FIGS. 3A and 3B show example views of information available for a mobile device.

Rather than a sidebar presentation, historical and person data can be can be displayed in an integrated interface such as shown in FIGS. 3A and 3B. Referring first to FIG. 3A, mobile device 200 includes a user interface associated with an active email application on the display 204.

In this example, mobile device 200 includes an application toolbar 302. The application toolbar can display an active area which can be touched or selected to view information. In the example shown for FIG. 3A, the application toolbar 302 includes a highlighted area indicating that the "Email" view is active on the display 204. The information displayed for the "Email" view can include information gathered from a repository of communication data or person data (i.e., not from the email client). These repositories of data are described earlier in association with FIGS. 1A-1C The mobile device 200 shown in FIG. 3B includes an application toolbar 352. The application toolbar 352 includes a highlighted area indicating that the "People" view is active on the display 204. The information displayed for the "People" view can include information gathered from a repository of communication data or person data.

In the example shown, the "People" view includes the name field 354, the number of new email messages field 356 and the average response time field 358 for the person indicated by the name field 354. For example, the first person shown in the "People" view of information has the name 354 "David Weiden". "David Weiden" has sent 5 new email messages as indicated by the new email messages field 356. The average response field 358 indicates that "David Weiden" responds to emails in an average of 10 minutes.

Figures 4A, 4B, 4C:
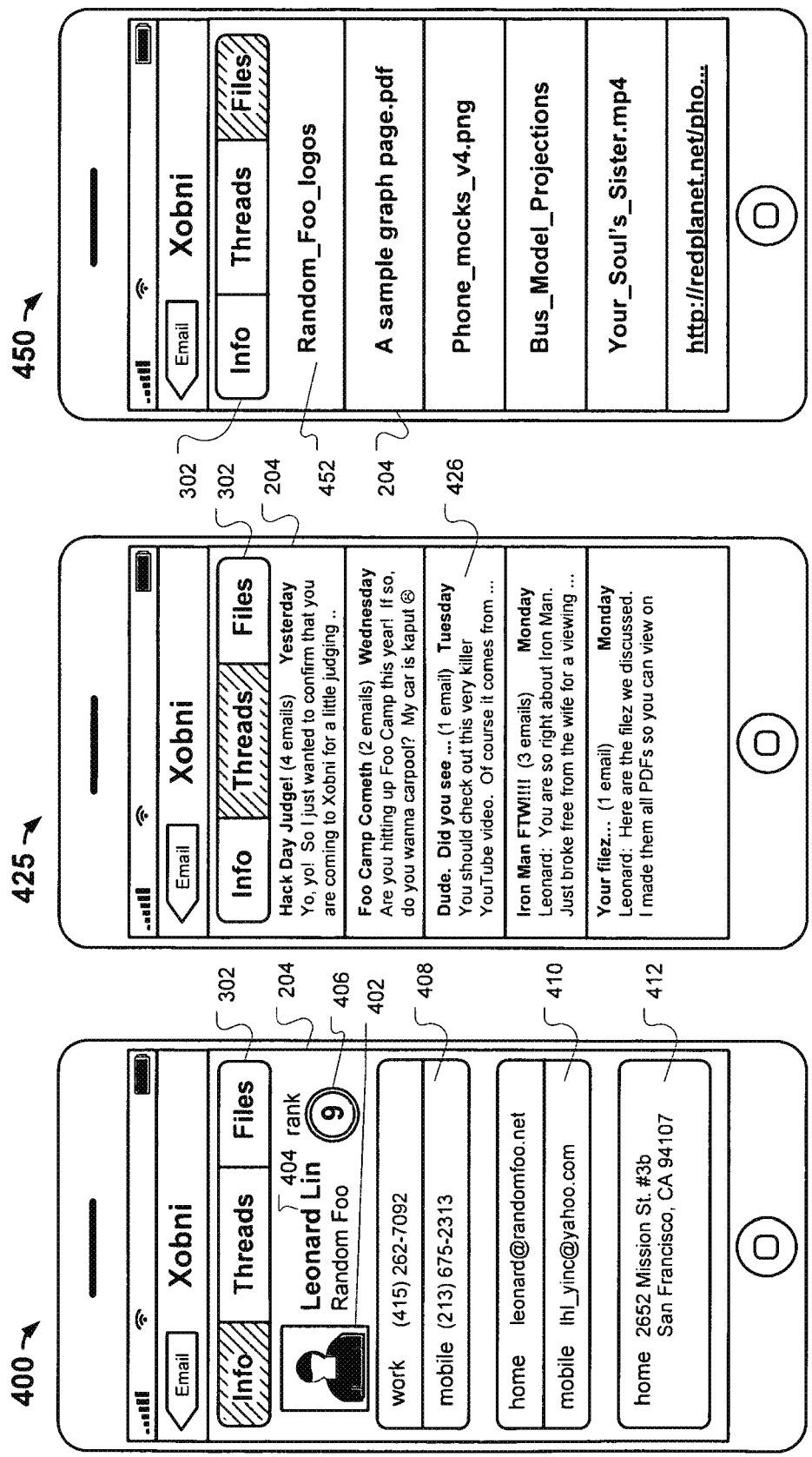
FIGS. 4A, 4B and 4C illustrate example conversation and personal data available for a mobile device.

FIGS. 4A, 4B and 4C illustrate example alternative user interfaces for presenting communication and personal data available for a mobile device. Mobile device 400 includes an application toolbar 302. The communication and personal data shown in the different views of the communication and personal data optimized, resized, or reformatted for the constraints of a smaller display area available to mobile devices.

FIG. 4A illustrates an example "Info" view of communication and personal data, as indicated by the highlighted application toolbar 302. In this example, the "Info" view of communication and personal data can include information about an incoming caller, an incoming email message sender, or other information. For example, the information displayed on the display 204 for the example mobile device 400 can include a photo 402 representing the person, a name 404 for the person and a rank 406 for the person. The photo 402 may depict an actual photograph of the person or any other type of image. The rank 406 can include a numerical value corresponding to a ranking system. Criteria used to rank can include the criteria described previously for FIG. 1.

FIG. 4B illustrates an example "Threads" view of communication and personal data, as indicated by the highlighted application toolbar 302. In some implementations, the mobile device 400 can display a list of recent conversation threads 426 involving a selected or highlighted sender 404 shown in FIG. 4A.

FIG. 4C illustrates an example "Files" view of communication and personal data, as indicated by the highlighted portion of application toolbar 302. The data can include a files exchanged list 452 shown on the display 204. The files exchanged list 452 can contain a list of files exchanged between the user of the mobile device 450 and a selected person 404. The files exchanged list 452 can also include hyperlinks to web pages, where the web page hyperlink was previously exchanged between the user and the person 404. In some implementations, for each file listed in the files exchanged list 452, the profile display 204 can present a file name, a file title, an icon, the time or date when the file was received, the amount of time that has elapsed since the file was received, the subject of the communication to which the file was attached, or other information about the file. Icons displayed next to a file name or file title can indicate what type of document the file is.

Clicking on or selecting a file in the files exchanged list 452 can cause the file to open. In some implementations, selecting a file can cause the communication to which the file was attached to be displayed. In some implementations, selecting a file can cause a list of files with the same file name to be displayed. This allows the different versions of a document that has undergone several rounds of revisions to be reviewed and compared to each other. In some implementations, selecting a file can cause a summary of the file to be generated and displayed. For example, hovering a cursor over or otherwise indicating a file in the files exchanged list 452 can cause an information bubble containing the title and first few lines of the file to be displayed. This list of files can include a time and date stamp for each version of the file so that the most recent revision can be easily identified. In some implementations, files can be copied from the files exchanged list 452 to other locations. In some implementations, files can be manually added or removed from the files exchanged list by the user.

FIG. 5 shows an example communication delivery system 500. In the system 500, a first device (e.g., computer 502) belonging to a first user can transmit a communication to a second device (e.g., mobile device 504) belonging to a second user over a computer network 506. The computer network 506 can be the Internet, an intranet, a LAN system or a company's internal computer network. In some implementations, the computer 502 and the mobile device 504 can be desktop computers, laptop computers, cell phones, web enabled televisions, or personal digital assistants. The communication transmitted from the computer 502 to the mobile device 504 can be an e-mail, phone call, instant message, text message, social network message or comment, message board post, or voice over IP communication.

The mobile device 504 can extract data from the communication about the first user. This data can be used to make a profile similar to the profile 130 shown in FIG. 1B. Data extracted from other communications with the first user can also be used to create a profile for the first user. Data that is extracted from communications with the first user can be used to query websites, search engines, person search directories and other sources of information for additional information about the first user that can be used to create a profile. Information from communications that can be used as search criteria include names, screen names, social network profile names, social network profile URLs, physical addresses, website URLs, e-mail addresses, or telephone numbers. Information that is collected as a result of these queries can be used in future searches to identify additional information that can be used to create a profile.

For example, the mobile device 504 can receive an e-mail sent by the first user from the computer 502. The mobile device 504 can perform a search using a search engine 508 with the first user's e-mail address as the search criteria. The search engine 508 can return a search result that includes the first user's phone number. This phone number can be displayed as part of a profile for the first user. The search engine 508 can also return the URL for or link to a personal website 510 belonging to the first user. The personal website 510 may contain additional information about the first user that can be used to create a profile, such as additional contact information or biographical information.

In another example, the e-mail address belonging to the first user may include an extension for a company. The mobile device 504 can perform a search using the search engine 508 with the e-mail extension as the search criteria. A result returned by the search can be a company website. The company website can be searched to reveal a profile page 512 for the first user on the company website. The profile page 512 may contain additional information about the first user that can be used to create a profile, such as additional contact information or biographical information.

In another example, the mobile device 504 can perform a search using a person search directory 514 with the first user's name or other contact information as the search criteria. The person search directory 514 can return search results with additional contact information and other information that can be used to create a profile for the first user.

In another example, the mobile device 504 can receive an e-mail sent by the first user from the computer 502. The e-mail can contain a social network profile name for the first user. The mobile device 504 can extract this social network profile name from the e-mail and use it to access a social network webpage 516. The social network webpage 516 can contain additional contact information and other information that can be extracted and used to create a profile for the first user. The social network webpage 516 can also contain additional contacts that can be associated with the first user in a profile. For example, persons on the friends list of the social network webpage 516, or persons who have posted comments or messages on the social network webpage 516 can be listed as contacts in a contact network for the first user.

In another example, a search performed using the search engine 508 can return a URL or link for a photo or video sharing website 518 on which the first user has a profile. Additional contact information or biographical information that can be extracted and used to create a profile for the first user. For example, a profile belonging to the first user on a video sharing website may include an instant message screen name for the first user. This screen name can be extracted and displayed as part of a profile for the first user.

Information extracted from communications between the first user and second user can also be used to update profile information on a social network webpage or other webpage. For example, the mobile device 504 can detect that the second user system has primarily used e-mail address "david@foo.com" in recent communications, while the second user's profile on the social network webpage 516 shows his email address as "david@bar.com". The mobile device 504 can share the second user's new e-mail address with the social network webpage 516 and the social network can automatically update the second user's info or suggest he update it based on this changed behavior recorded by the mobile device 504.

Information from travel websites and on-line retailers can also be extracted and displayed as part of a profile. For example, an e-mail containing information about a flight itinerary can be received by the mobile device 504. The mobile device 504 can extract a flight number or other information about a flight from the e-mail. The mobile device 504 can then query a travel website 520 using the flight number or other flight information as search criteria. Information about the flight, such as expected departure time, expected arrival time, expected delays, weather in the destination city, weather in the departure city, or any changes to the flight can be displayed as part of a profile.

In another example, an e-mail containing information about an item or service that the second user is interested in purchasing can be received by the mobile device 504. The mobile device 504 can query one or more search engines, websites, or on-line retailers 522 to determine which retailer or website has the best price or currently has the item in stock or the service available. This information can then be displayed as part of the profile.

Information from mapping web sites and location tracking servers can also be extracted and displayed as part of a profile. For example, the first user can own a GPS unit, cell phone, or other device that is capable of transmitting the first user's current physical location. A location tracking server 524 can receive this transmission and allow other users to access the first user's current location information. If the second user has permission to view the location information for the first user, the mobile device 504 can access the location tracking server using the computer network 506 to receive location information about the first user. This location information can be displayed as part of a profile.

The mobile device 504 can also access a maps and directions website 526 to create a map of the first user's current location, or to generate directions to the first user's current location. The map or directions can be displayed as part of a profile for the first user. The maps and directions website 526 can also be used to generate a map or directions to one or more known addresses for the first user, such as a work address or home address. The map or directions can be displayed as part of a profile for the first user.

Figure 6:
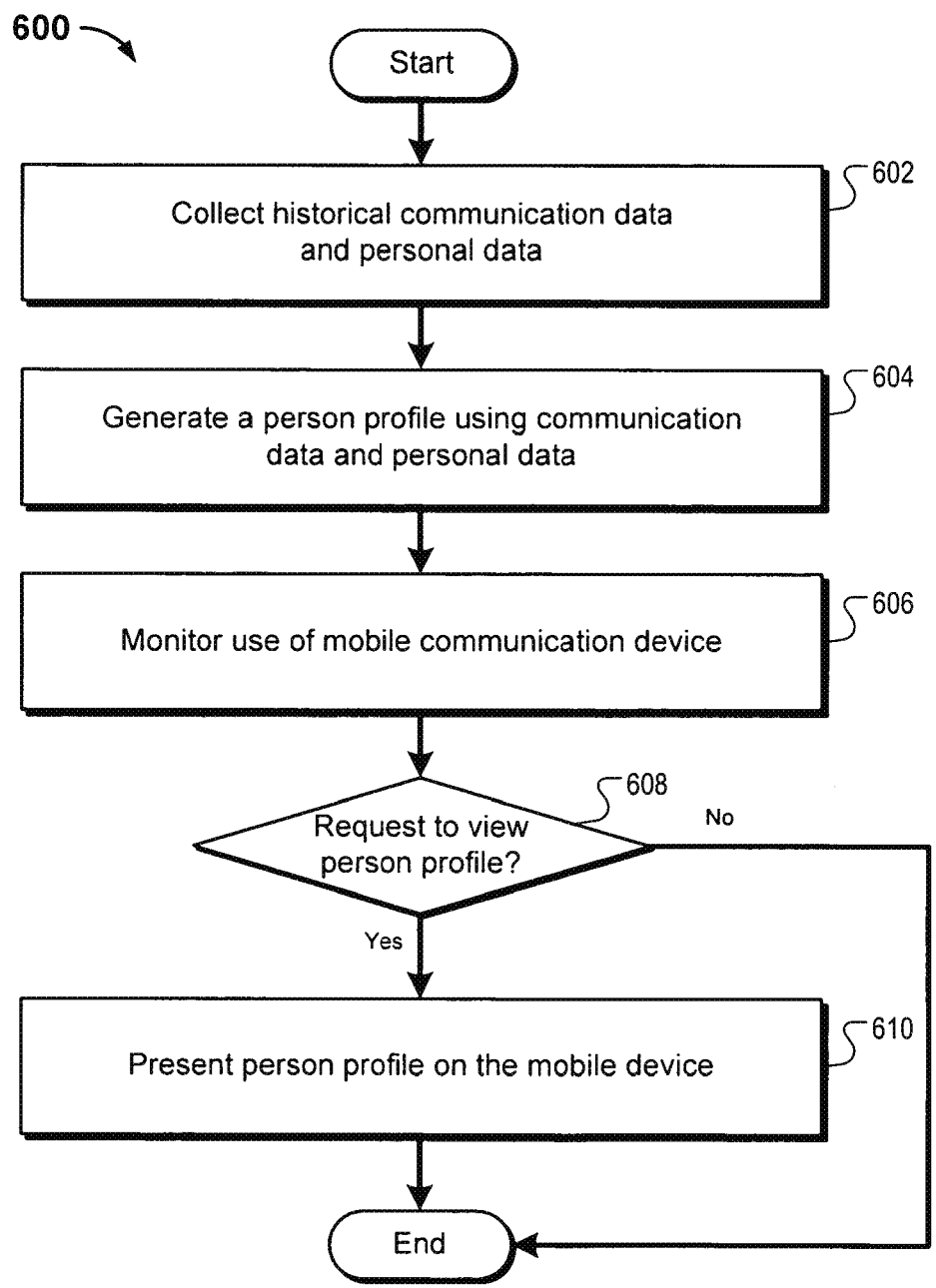
FIG. 6 is a flow diagram of an example process for collecting and presenting historical communication and personal data for a mobile device.

FIG. 6 is a flow diagram of an example process 600 for collecting and presenting historical communication and personal data on a mobile device. The process 600 can, for example, be implemented in a system such as the system 100 of FIG. 1A. In another example, the process 600 can be implemented in a system such as the communication delivery system 500 of FIG. 5.

Stage 602 collects historical communication data and personal data. For example, communications such as e-mails, instant messages, phone calls, text messages, internet message board postings, social network messages or comments, or voice over IP communications can be collected. Historical communication data and personal data can also be collected from web search engines, people search engines, social networks, e-mail clients, personal web pages, telephone directories, scanned business card data, picture sharing websites, video sharing websites, profile pages, travel websites, on-line retailers, or customer relationship management systems.

The collected historical communication data and personal data can include a log or history of telephone calls, contact information, biographical information, communication text, communication summaries, physical location information, mapping information, attachments to communications, weather information, travel information, and retail information.

Stage 604 generates a profile using communication data and personal data. The source of the communication data and personal data can be any type of repository. For example, the collected data can be stored in a database on a users computer. The collected data can also be stored on a network server, a web server, a removable storage device, or as part of an e-mail client or other communication client.

Stage 606 monitors the use of the mobile communication device, such as the mobile device 200 described earlier for FIG. 2. For example, a system implementing the method 600 can track the received telephone calls, received email messages, mouse movements, keyboard strokes, or mouse clicks of a user of the system, or active windows or mouse locations displayed on a display device of the system. The users behavior can be monitored to determine if a user has opened, viewed, read, or composed a communication, such as an e-mail. The users behavior can also be monitored to determine if the user has initiated a telephone call, performed a search, clicked on a particular item, or selected a particular item.

At state 608, a request to view a profile can be received. If the request is received, the system 600 can present the profile on the mobile device at state 610. If the request is not received, the process 600 can end.

Stage 610 presents data from the repository in response to user behavior. For example, referring to FIG. 1A, the profile 108 can be displayed in response to a user selecting the e-mail 110 in the inbox viewing panel 104. In another example, information about a person can be displayed in response to a user performing a search for the person's name. In another example, information about a file can be displayed in response to a user clicking on the file in an e-mail or other communication. In another example, information about a topic can be displayed in response to a user clicking on or selecting text within the body of a communication.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    identifying an automated web service based on a domain name associated with communications sent to a user, the communications comprising a sender address associated with the automated web service and a recipient address associated with the user;
    receiving communications sent by the automated web service to the user of a communication device;
    automatically generating a profile for the automated web service from data extracted from the communications;
    sending a query to a first computing device over a network using the data extracted from the communications in response to receiving a new communication from the automated web service, the query being performed using search criteria including a phone number;
    receiving, from the first computing device, second information from a social network profile of the automated web service stored by the first computing device;
    updating the profile using the second information; and
    enabling presentation of the profile on the communication device in response to a user request on the communication device.

2. The method of claim 1, further comprising:
    determining that the user of the communication device is selecting at least one contact in a list of contacts; and
    causing at least one action to occur on the communication device that corresponds to the at least one contact.

3. The method of claim 2, wherein the at least one action includes generating a message addressed to the at least one contact.

4. The method of claim 1, further comprising presenting information to the user of the communication device from the profile when the user interacts with a piece of information in a user display associated with a service provided by the first computing device.

5. The method of claim 1, wherein the presentation includes adapting the profile for display on the communication device.

6. The method of claim 5, wherein the adapting includes identifying a subset of information from the profile to present on the communication device.

7. The method of claim 5, wherein the adapting includes changing a format of information associated with the profile.

8. The method of claim 5, wherein the adapting includes ordering information in the profile and presenting the information obtained from the profile in accordance with the ordering.

9. The method of claim 1, wherein the receiving the second information comprises receiving a link.

10. A non-transitory computer readable storage medium for tangibly storing computer program instructions capable of being executed by a computer processor, the computer program instructions defining the steps of:
    identifying an automated web service based on a domain name associated with communications sent to a user, the communications comprising a sender address associated with the automated web service and a recipient address associated with the user;
    receiving communications sent by the automated web service to the user of a communication device;
    automatically generating a profile for the automated web service from data extracted from the communications;
    sending a query to a first computing device over a network using the data extracted from the communications in response to receiving a new communication from the automated web service, the query being performed using search criteria including a phone number;
    receiving, from the first computing device, second information from a social network profile of the automated web service stored by the first computing device;
    updating the profile using the second information; and
    enabling presentation of the profile on the communication device in response to a user request on the communication device.

11. The non-transitory computer readable storage medium of claim 10, further comprising:
    determining that the user of the communication device is selecting at least one contact in a list of contacts; and
    causing at least one action to occur on the communication device that corresponds to the at least one contact.

12. The non-transitory computer readable storage medium of claim 11, wherein the at least one action includes generating a message addressed to the at least one contact.

13. The non-transitory computer readable storage medium of claim 10, further comprising presenting information to the user of the communication device from the profile when the user interacts with a piece of information in a user display associated with a service provided by the first computing device.

14. The non-transitory computer readable storage medium of claim 10, wherein the presentation includes adapting the profile for display on the communication device.

15. The non-transitory computer readable storage medium of claim 14, wherein the adapting includes an operation selected from the group consisting of identifying a subset of information from the profile to present on the communication device, changing a format of information associated with the profile, and presenting the information obtained from the profile after ordering information in the profile.

16. The non-transitory computer readable storage medium of claim 10, wherein the receiving the second information comprises receiving a link.

17. An apparatus comprising:
   a processor; and
   a storage medium for tangibly storing thereon program logic for execution by the processor, the stored program logic causing the processor to perform the operations of:
      identifying an automated web service based on a domain name associated with communications sent to a user, the communications comprising a sender address associated with the automated web service and a recipient address associated with the user;
      receiving communications sent by the automated web service to the user of a communication device;
      automatically generating a profile for the automated web service from data extracted from the communications;
      sending a query to a first computing device over a network using the data extracted from the communications in response to receiving a new communication from the automated web service, the query being performed using search criteria including a phone number;
      receiving, from the first computing device, second information from a social network profile of the automated web service stored by the first computing device;
      updating the profile using the second information; and
      enabling presentation of the profile on the communication device in response to a user request on the communication device.

18. The apparatus of claim 17, the stored program logic further causing the processor to perform the operations of:
   determining that the user of the communication device is selecting at least one contact in a list of contacts; and
   causing at least one action to occur on the communication device that corresponds to the at least one contact.

\* \* \* \* \*